United States Patent [19]
Harte

[11] 3,935,649
[45] Feb. 3, 1976

[54] MULTI-PURPOSE MATHEMATICAL AID

[76] Inventor: James Richard Harte, 10 W. Concord, Kansas City, Mo. 64112

[22] Filed: Mar. 1, 1974

[21] Appl. No.: 447,084

[30] Foreign Application Priority Data
Nov. 9, 1973 United Kingdom............... 52214/73

[52] U.S. Cl.................. 35/31 D; 35/70; 35/72; 35/73
[51] Int. Cl.² ......................................... G09B 19/02
[58] Field of Search ...... 35/31 R, 31 D, 31 F, 31 G, 35/30, 32, 33, 34, 70, 69, 72, 73; 206/1.7

[56] References Cited
UNITED STATES PATENTS

| | | | |
|---|---|---|---|
| 275,329 | 4/1883 | Crandall | 35/73 |
| 2,502,238 | 3/1950 | Wade et al. | 35/31 F |
| 2,611,193 | 9/1952 | Davis | 35/31 R |
| 3,077,677 | 2/1963 | Malkin et al. | 35/73 X |
| 3,191,318 | 6/1965 | Hoffmann | 35/34 |
| 3,410,002 | 11/1968 | Mulholland et al. | 35/31 R |
| 3,414,343 | 12/1968 | Thomas | 206/1.7 X |
| 3,414,986 | 12/1968 | Stassen | 35/72 X |
| 3,521,383 | 7/1970 | Terwilleger | 35/31 D |
| 3,624,927 | 12/1971 | Sandlin | 35/32 |
| 3,797,134 | 3/1974 | Wingerd | 35/34 |

FOREIGN PATENTS OR APPLICATIONS

| | | | |
|---|---|---|---|
| 597,762 | 2/1948 | United Kingdom | 35/18 A |

Primary Examiner—Wm. H. Grieb
Attorney, Agent, or Firm—D. A. N. Chase

[57] ABSTRACT

A multi-purpose mathematical aid designed to allow students, especially children, to see mathematical relationships by manipulation of materials. In its preferred form the mathematical aid comprises two moulded plates forming two halves of a storage case. Each plate has recessed square areas on one face for use with counting bars and catchment areas on the other face for use with disc or fractions of discs. The counting bars may, for example, be square or rectangular and may be adapted to rest in the recessed square areas.

6 Claims, 65 Drawing Figures

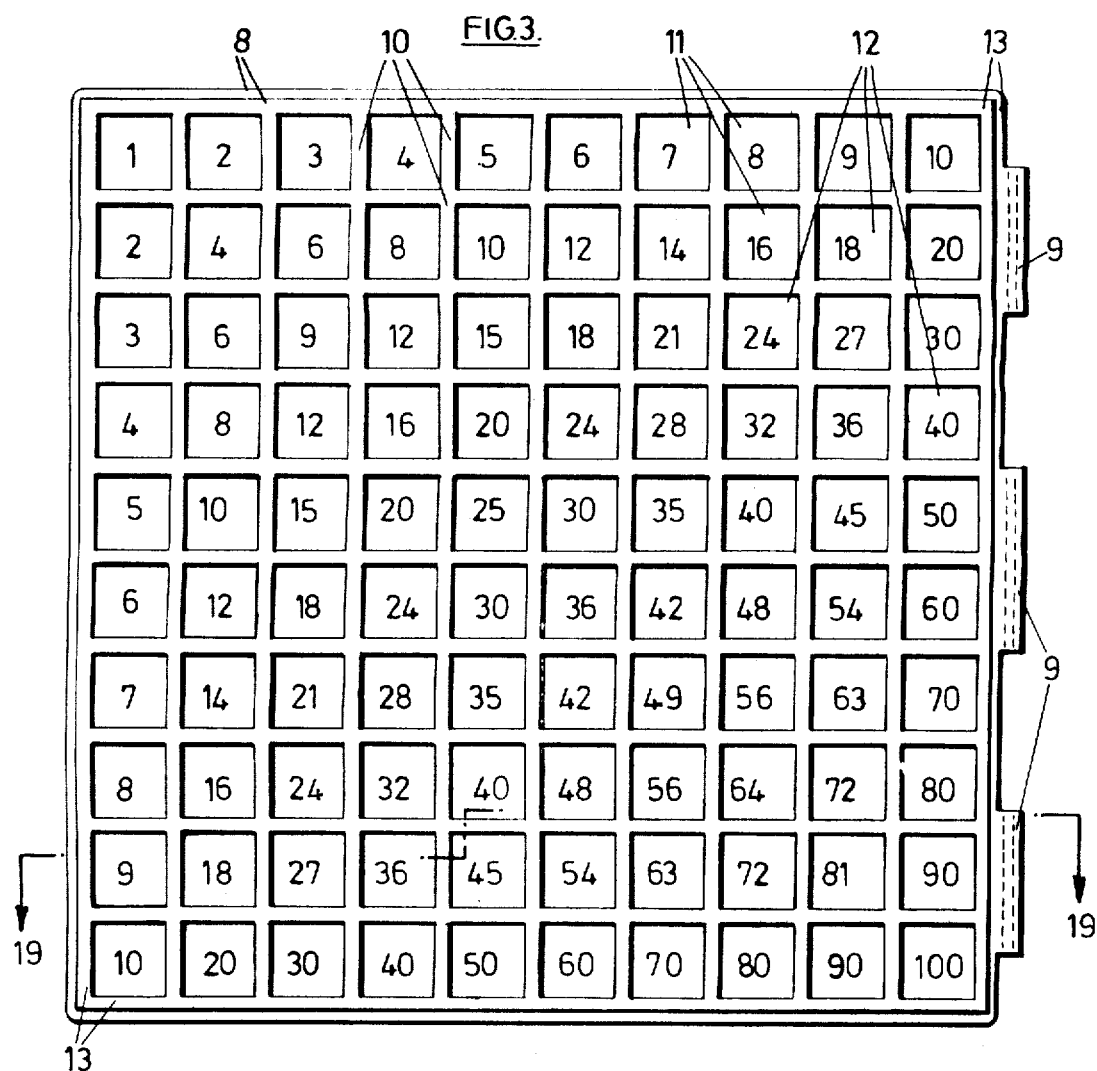

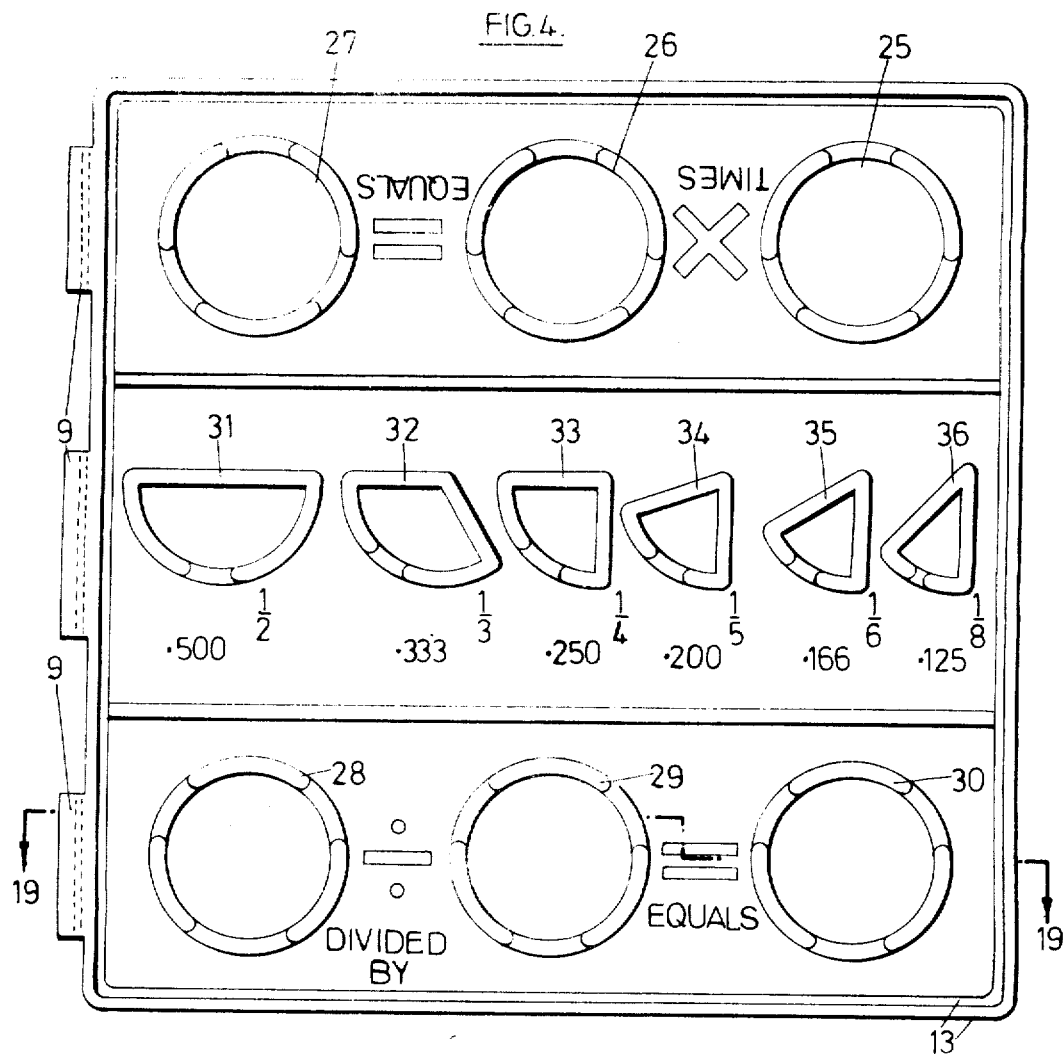
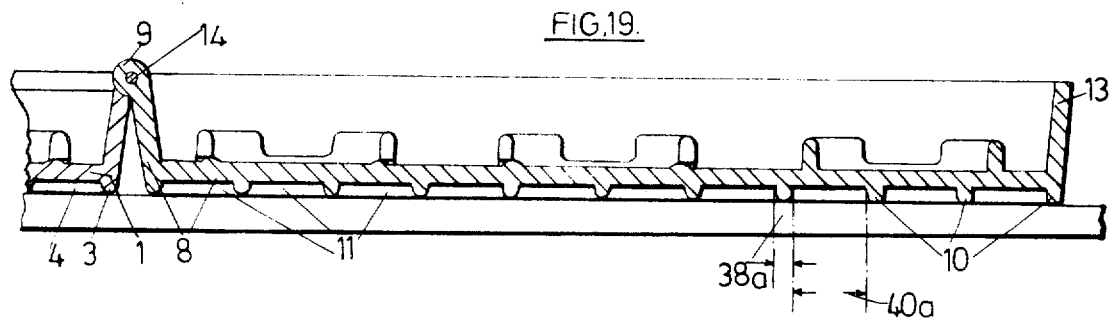

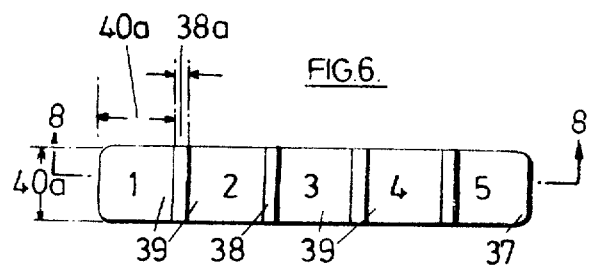
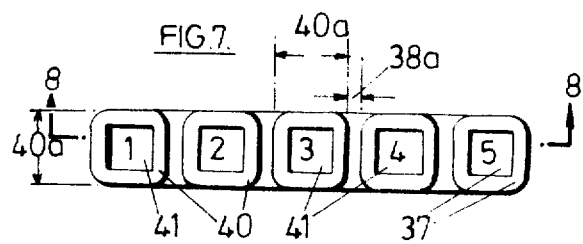
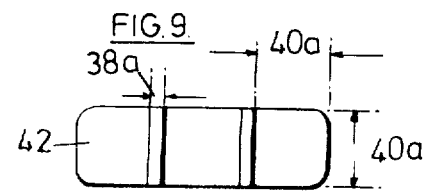
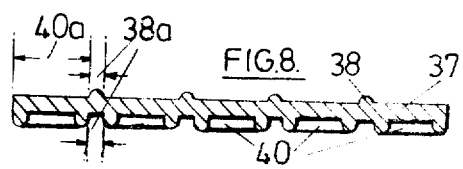
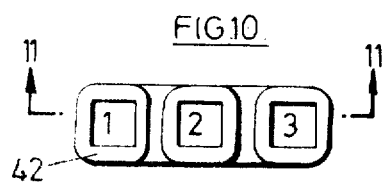
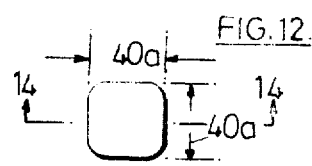

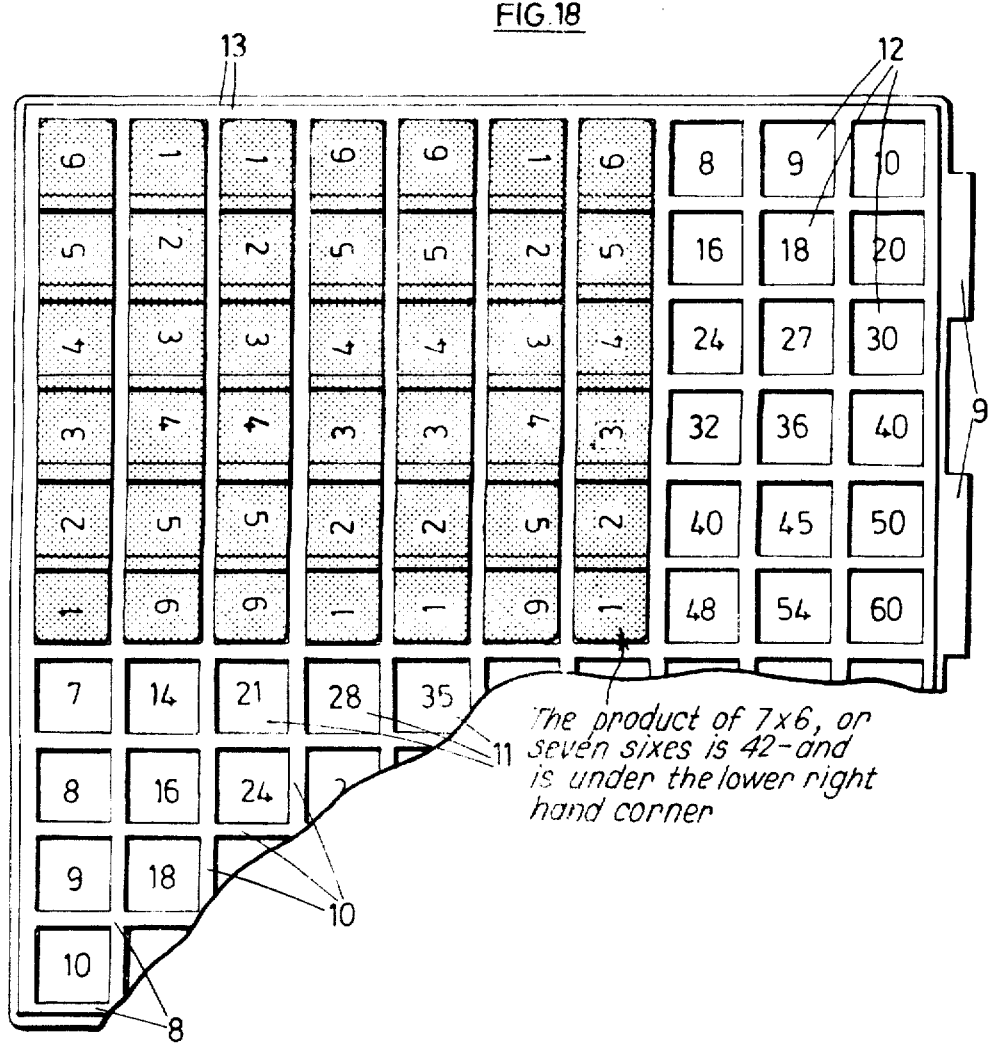

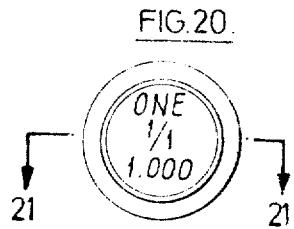
FIG.20.
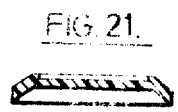
FIG.21.
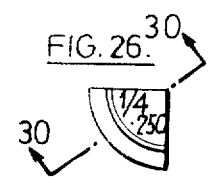
FIG.26.
FIG.22.
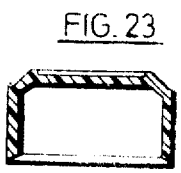
FIG.23.
FIG.28.
FIG.25.
FIG.29.
FIG.24.
FIG.27.
FIG.30.

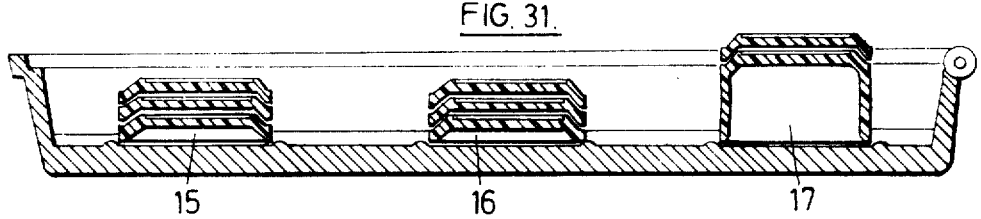
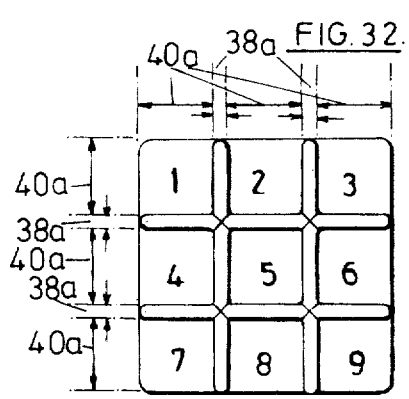
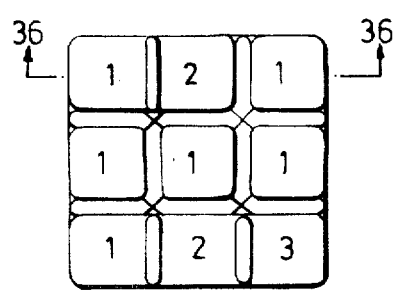
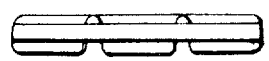
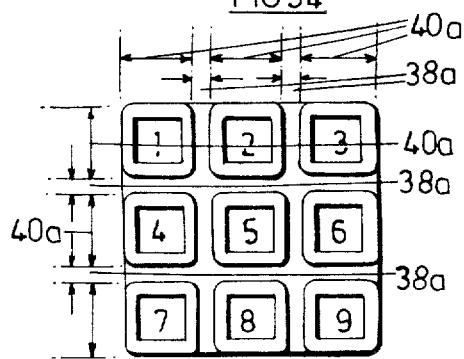
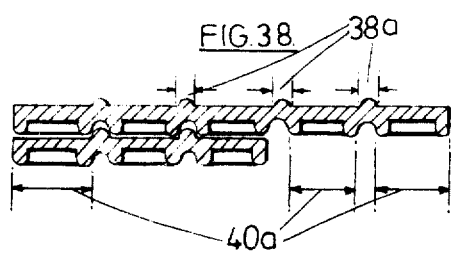

FIG.45.
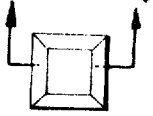
FIG.46.
FIG.47.
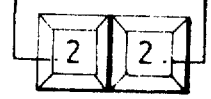
FIG.48.
FIG.49.
FIG.51.
FIG.50.
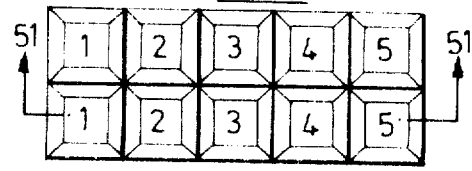
FIG.53.
FIG.52.
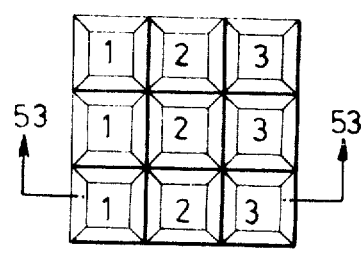

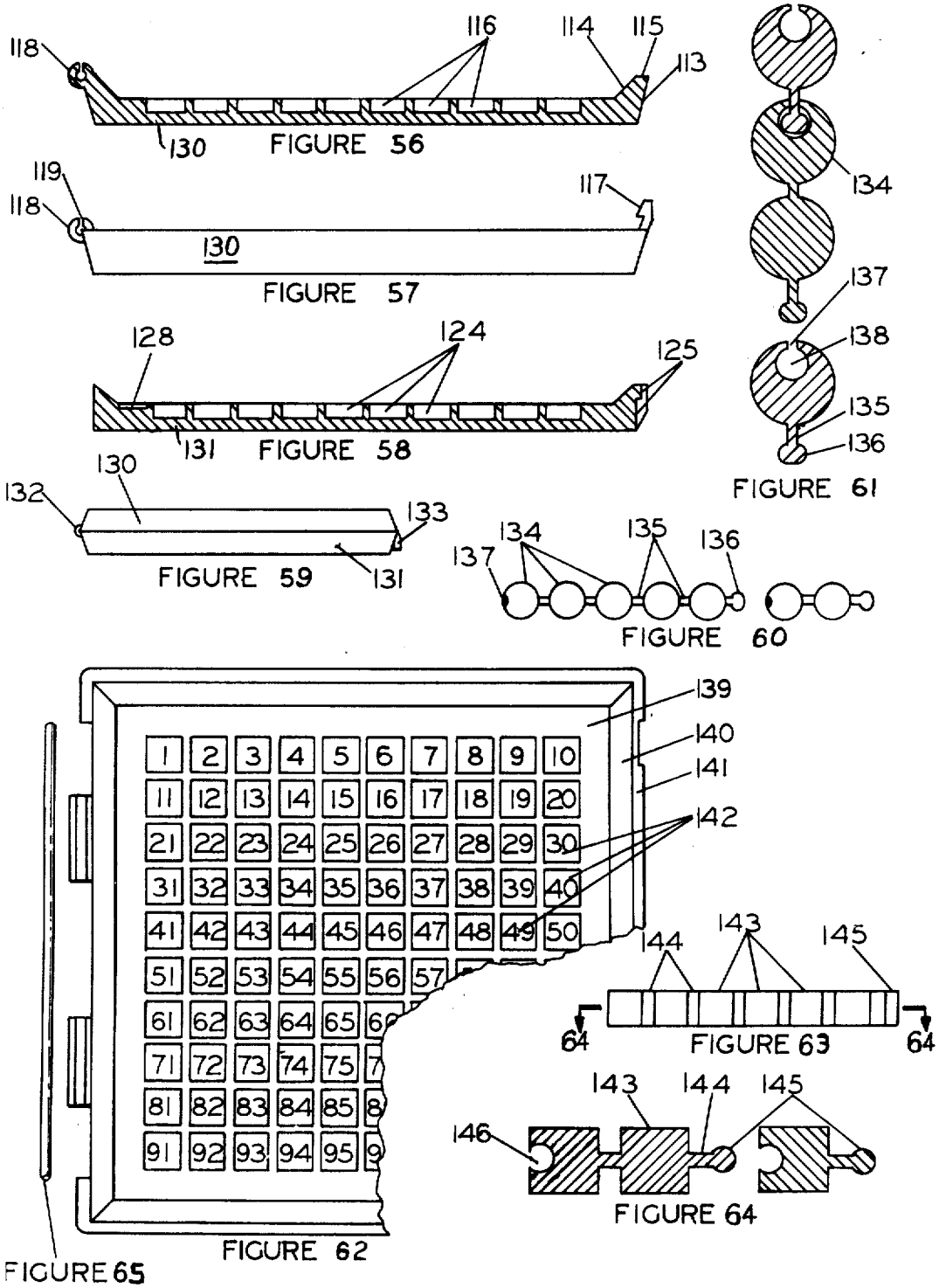

MULTI-PURPOSE MATHEMATICAL AID

This invention relates to a multi-purpose mathematical aid.

The mathematical aid embodying the invention particularly is designed to allow students, especially children, to see mathematical relationships by manipulation of materials.

For example in its different forms, the aid may be used to familiarize the student with the fundamentals of fractions, addition, subtraction, multiplication, and division of whole numbers and fractions; the multiplication tables; and the decimal equivalents of fractions and whole numbers.

In accordance with the invention, a mathematical aid comprises a moulded plate divided up into a plurality of recessed areas, or areas divided by a grid of ridges, the areas being adapted to receive single or multiple segmented counting bars.

The areas are preferably in the form of an arrangement of $n \times n$ areas with an orderly series of numbers from 1 to $n^2$ printed or mounted on the plate to facilitate exercise of addition, subtraction, multiplication and division skills.

The areas may be in an orderly arrangement of $n \times n$ and may contain numbers representing the products of the multiplication tables up to $n \times n$ in an orderly manner.

Preferably the plate has said recessed areas on one face and has catchment areas for discs and/or fractions of discs on the other face so that both sides of the plate may be used.

Two such plates may be so shaped and constructed that they can be joined together by a simple hinge to form a storage case for use in storing counting bars or other material.

The multipurpose mathematical aid is designed to be made of molded plastic or of similar moldable material.

The multipurpose mathematical aid may be designed so that the moulded plate is a single plate, or there are two individual plates, or with two such plates forming two halves of a storage case. In the event the storage case is the preferred design, the other components to be manipulated such as the single or multiple counting bars can be stored in the interior of the case when it is not in use. The storage case arrangement provides for compactness, and easy storage of materials to be manipulated.

The counting bars are of two major types. One major type of smaller components are square or rectangular counting bars. These square or rectangular counting bars may be constructed so that they nest in recessed square areas in a grid pattern. A symmetrical grid of ridges surrounds the recessed square areas. The square or rectangular counting bars are so constructed that they nest in the recessed areas in the larger plates (or storage case halves) and also so that they nest one on top of another. These square or rectangular counting bars may be numbered on only one surface, on both surfaces, or on neither surface. When the counting bars are numbered, the numbers are arranged in an orderly manner so as to illustrate the number of units in that counting bar. These segmented counting bars may be, for example, from one to ten units in length, and from one to ten units in width. When counting bars are more than two units in width they may be numbered so as to illustrate the total number of units in the bar; or they may be numbered so as to indicate how many units are in each row; or how many units are in that bar (e.g. a bar of six units each unit would be marked with a 6 on one surface). That is, a counting bar of two units in width and five units in length may contain numbers up to 10, or it may contain numbers up to five — two times, or on one surface it may have the number 10 on the surface of each unit.

The segmented counting bars may be so constructed that they are self-alligning when stacked or nested.

Three types of square or rectangular counting bars, and accompanying larger plates or storage case halves are illustrated. One type of counting bar, and accompanying plate or storage case half, — the first illustrated, — has a narrow segment of material between the units, and a ridge extends above this narrow segment of material. In the second type of counting bar, and accompanying plate or storage case half, one unit is in immediate apposition or juxtaposition with the other. In this second type of counting bar, when units are multiple, there is no separation area or segment of material between the units that are molded as a part of a single piece. In the third type of square unit counting bar, it has ends that have a receiving socket, and also ends that have a cylindrical enlargement that fits in the circular socket of another counting bar. These types of ends allow them to be linked.

A fourth type of counting bar consists of linked spheres that have the same center to center distance as does the receiving grid of circular catchment areas.

The different types of counting bars are reflected in the different types of catchment areas and grids on the plates or storage case halves constructed to receive them.

In using the plates or storage case halves with an elevated grid of ridges and accompanying counting bars, the student or child is to place the segmented counting bars of lengths up to and including ten on the appropriate surface of the plates for addition and subtraction; or on the surface of the other plate for multiplication and division. The segmented counting bars are to be placed in an orderly manner, starting with the numeral one in the upper left hand corner. The manipulation of the counting bars varies with addition, subtraction, multiplication, and division.

The other type of component in this invention are discs of uniform diameter that represent one or more units. The height of the disc determines its value. That is, a disc with a value of three, would be three times as high as a disc with a value of one. Fractions of one may also be represented as that fraction of a disc. Common fractions from one half to one eight are represented. These disc units are so constructed that they will nest or stack and are self-centering when stacked one on another. Numbers indicating the decimal equivalents of the fractional parts of the discs can be molded on one surface of the fraction of the disc.

These discs, and/or fractions of these discs can be used in conjunction with disc catchment or disc retaining areas. These disc retaining areas are located on the opposite side of the large grid plates or storage case halves that are used in conjunction with the manipulation of the counting bars. Or the student can manipulate these discs and fractions of discs without using retaining areas in hiis experimentation with math relationships.

In the drawings:

FIG. 1 illustrates the outer surface of one of the major components that makes up one half of the storage case and has numerals 1 to 100 in an orderly sequence on its upper surface in a 10 × 10 grid of numbers. FIG. 1 also illustrates a cutaway section of the outer surface of the other major component that makes up the other half of the storage case. FIG. 1 also illustrates the use of a hinge pin whereby the two halves of the storage case are joined.

FIG. 2 represents the inner surface of the half of the storage case that is fully illustrated in FIG. 1. On this inner working surface are catchment or retaining areas for discs being manipulated in the processes of addition, subtraction, and recognizing fractional relationships. Also illustrated in FIG. 2 is the relationship of the hinge pin to the hinge half, when the two halves of the storage case are separated.

FIG. 3 is the outer surface of the other major component that is illustrated as a cutaway section in FIG. 1. This major component makes up the other half of the storage case. On the outer surface of this component are a grid of ridges, and a 10 × 10 grid of numbers in recessed areas that illustrate the products and numerical relationships of the multiplication tables in an orderly manner.

FIG. 4 illustrates the inner surface of FIG. 3. FIG. 4 has on its working surface catchment areas or retaining areas for discs being manipulated during the processes of multiplication and division. Also on this inner surface are catchment or retaining areas for common fractional parts of the whole disc. Near the catchment areas for fractions, are numerical indicators of the fraction and/or decimal equivalent of that fraction.

FIG. 5 is a cutaway view along lines 5—5 of FIGS. 1 and 2. FIG. 5 illustrates the relationships of the two major parts when they are constructed as storage case halves that are hinged along one edge.

FIG. 6 is the upper surface view of one type of numbered segmented counting bar. This bar is five units in length. In this design, the square units have a narrow connecting segment of material between each two adjacent square units that are a part of the same counting bar. Above this narrow connecting segment is a ridge of material. These segmented counting bars can be nested in the numbered recessed areas on the flat outer surfaces of the two major components of the multipurpose math aid illustrated in FIGS. 1 and 3. These recessed areas contain an orderly pattern of numbers as are illustrated in FIGS. 1 and 3. The manner of nesting these segmented counting bars in the grid of ridges on the plates or outer parts of the storage case halves is illustrated in FIGS. 15, 17 and 18.

FIG. 7 is the underside view of FIG. 6.

FIG. 8 is a cross-sectional view through lines 8—8 of FIGS. 6 and 7.

FIG. 9 is the upper surface of a numbered segmented counting bar of three units in length. This counting bar is similar in function and appearance to the counting bar illustrated in FIGS. 6, 7, and 8, except it is composed of only three units and two connecting segments, and is numbered on only one surface.

FIG. 10 is the bottom surface of FIG. 9.

FIG. 11 is a cutaway-cross sectional view along line 11—11 of FIG. 10.

FIG. 12 is the upper surface of an unnumbered counting bar of one unit. It is similar to the five unit and three unit counting bars illustrated in FIGS. 6 through 11, except it does not have a connecting segment.

FIG. 13 is a bottom view of FIG. 12.

FIG. 14 is a cross sectional view along lines 14—14 of FIG. 12.

Figure 15:
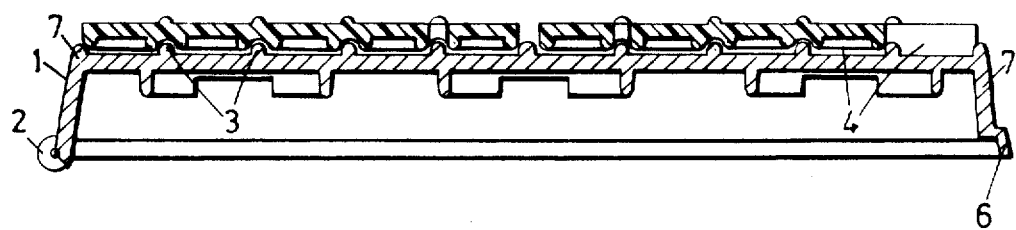
Figure 17:
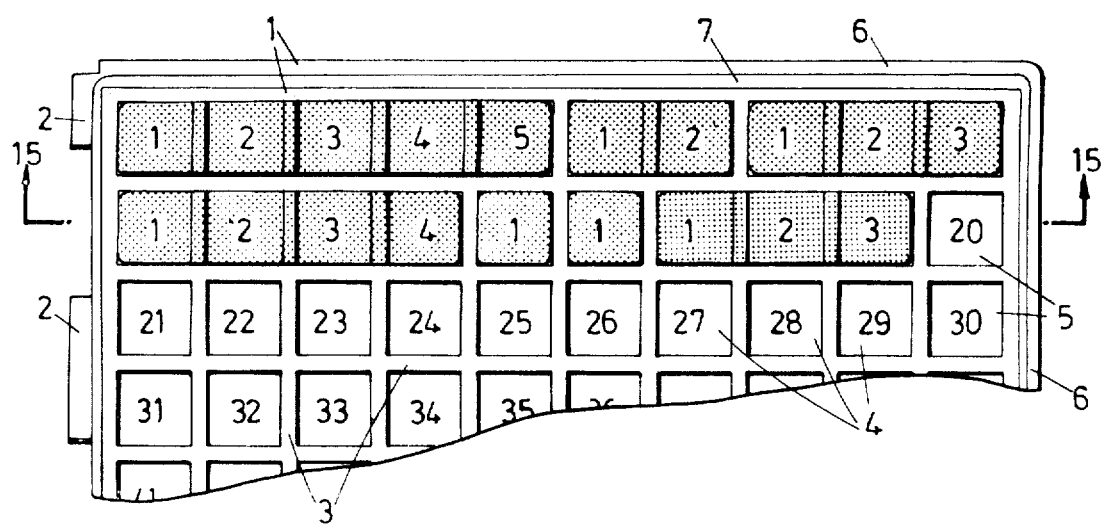

FIG. 15 is a cross sectional view taken along line 15—15 of FIG. 17. FIG. 15 shows how the segmented counting bars illustrated in FIGS. 6 through 14 nest in the numbered recessed areas of the main plates — or in the recessed areas on the outer surfaces of the two storage case halves. FIG. 15 also illustrates the narrow space that exists between units when these units are from different counting bars. (This space does not exist between the units of different counting bars in another version of this invention. See FIGS. 39 through 52).

Figure 16:
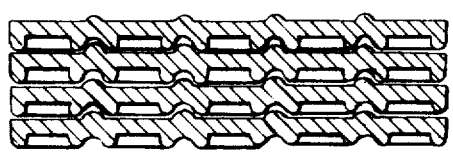

FIG. 16 illustrates how the numbered segmented counting bars described in FIGS. 6 through 14 can nest one on top of the other.

Figure 1:
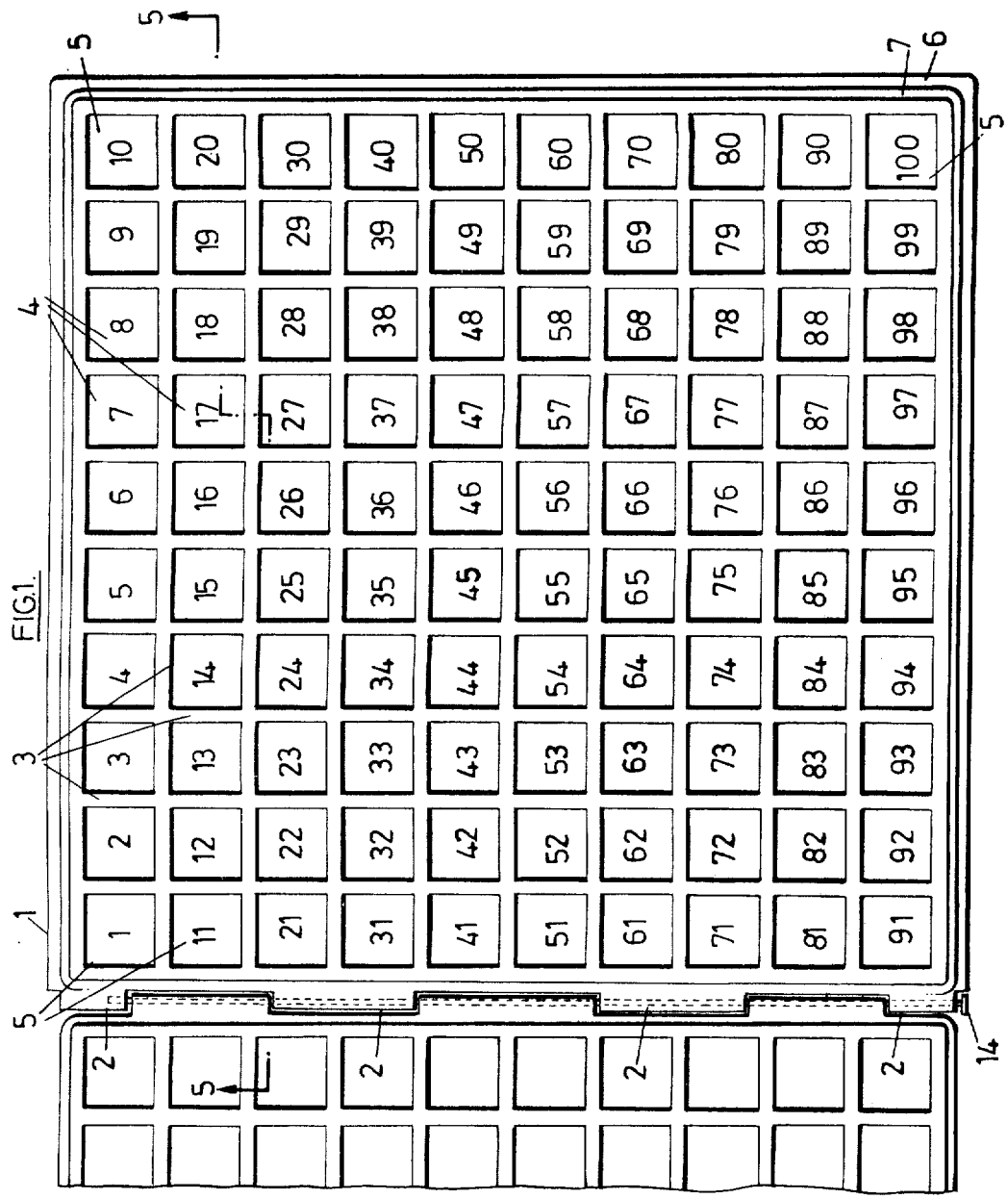

FIG. 17 illustrates numbered segmented counting bars nesting in the numbered recessed areas of FIG. 1 in an orderly sequential manner, so that the units in these bars sum to total 19. FIG. 17 also illustrates the narrow space between the units when adjacent units are not a part of the same counting bar.

FIG. 18 illustrates seven numbered segmented counting bars, each containing six units, and with each counting bar nested in the grid on the storage case half so as to illustrate the use of counting bars with a 10 × 10 grid with the numbering pattern illustrated in FIG. 3. FIG. 3 demonstrates an orderly numbering pattern where the numbers represent the products of the multiplication tables.

FIG. 19 is a cross sectional view from along lines 19—19 of FIGS. 3 and 4. FIG. 19 also illustrates the open position of the two grid containing plates when constructed as halves of a storage case.

FIG. 20 is the top view of a disc shaped unit with a value of one. The disc is of a diameter to conveniently fit in disc catchment areas 15 thru 20 and 25 thru 30.

FIG. 21 is a cross section cutaway view along line 21—21 of FIG. 20, and shows contours for stacking in a disc of one unit in height.

FIG. 22 is the top view of a disc (or cylindrical) shaped unit with a value of five.

FIG. 23 is a cross section view along line 23—23 of FIG. 22.

FIG. 24 illustrates the upper surface of one half of a disc shaped unit.

FIG. 25 illustrates the upper surface of one third of a disc shaped unit.

FIG. 26 illustrates the upper surface of one fourth of a disc shaped unit.

FIG. 27 illustrates the upper surface of one fifth of a disc shaped unit.

FIG. 28 illustrates the upper surface of one sixth of a disc shaped unit.

FIG. 29 illustrates the upper surface of one eighth of a disc shaped unit.

FIG. 30 illustrates a cross section — cutaway view along line 30—30 of FIG. 26.

Figure 2:
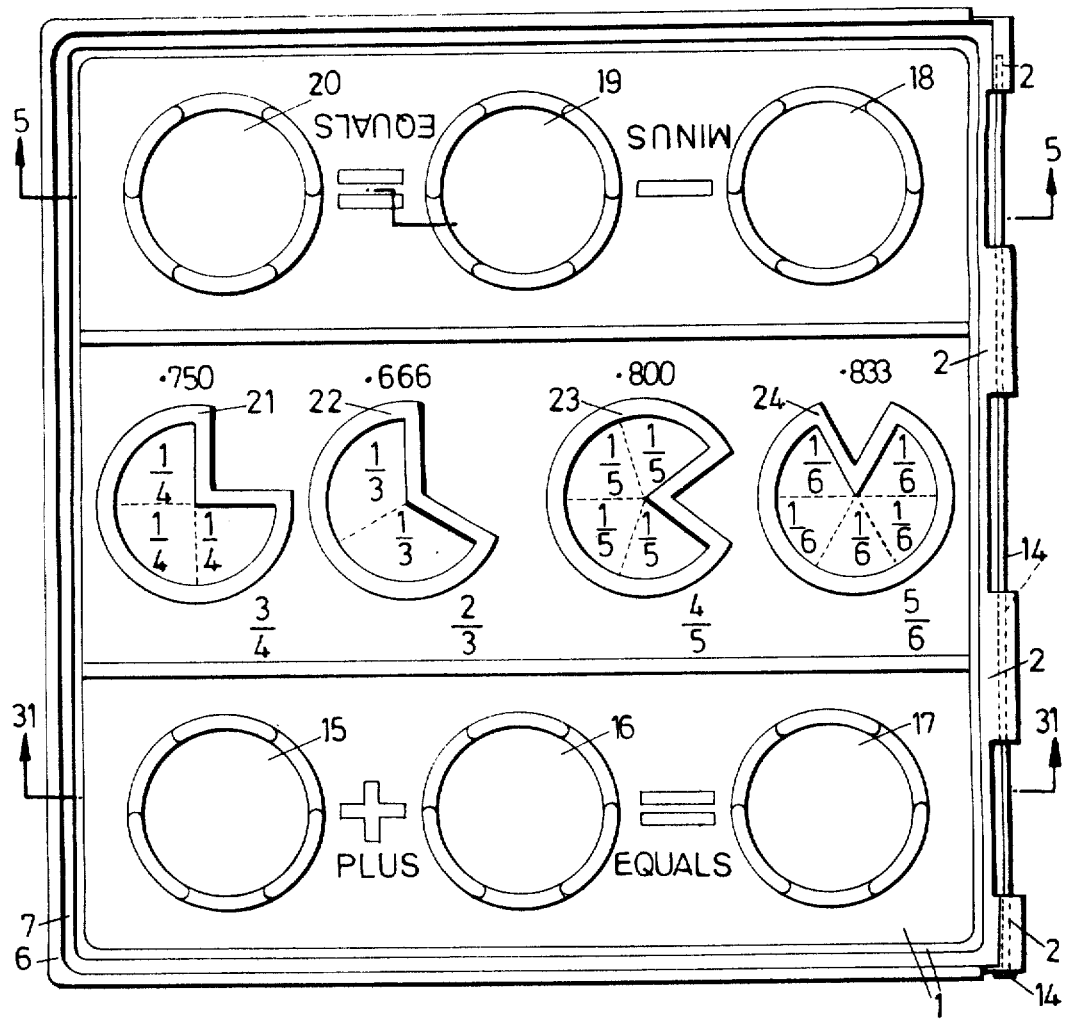

FIG. 31 illustrates a cutaway cross section view along line 31—31 of FIG. 2 with discs in the disc retaining areas intersected by line 31—31.

FIG. 32 illustrates the top view of a numbered segmented counting bar of three units in width and three units in length.

FIG. 33 illustrates a side view or end view of FIG. 32.

FIG. 34 illustrates the bottom view of FIGS. 32 and 33.

FIG. 35 illustrates the placements of numbered segmented counting bars of one unit in width and one to three units in length on top of the numbered segmented counting bar illustrated in FIGS. 32, 33 and 34.

FIG. 36 is a cutaway cross section view along line 36—36 of FIG. 35. FIG. 36 illustrates the space between counting bars of two units in length and the counting bars of one unit in length when they are nested.

FIG. 37 illustrates the placement of the counting bar in FIG. 11 on top of the counting bar in FIG. 8;

FIG. 38 represents the placement of the counting bar in FIG. 8 on top of the counting bar in FIG. 11.

FIGS. 39 through 53 are similar in design and function to FIGS. 1, 3, 5 through 19, and 32 through 38, except that in FIGS. 39 through 53, the narrow segment, or space between adjacent units of the same bar, or of different bars has been eliminated. Also the large plates, or surfaces of the storage case halves have been redesigned to eliminate this narrow segment or space.

Figure 39:
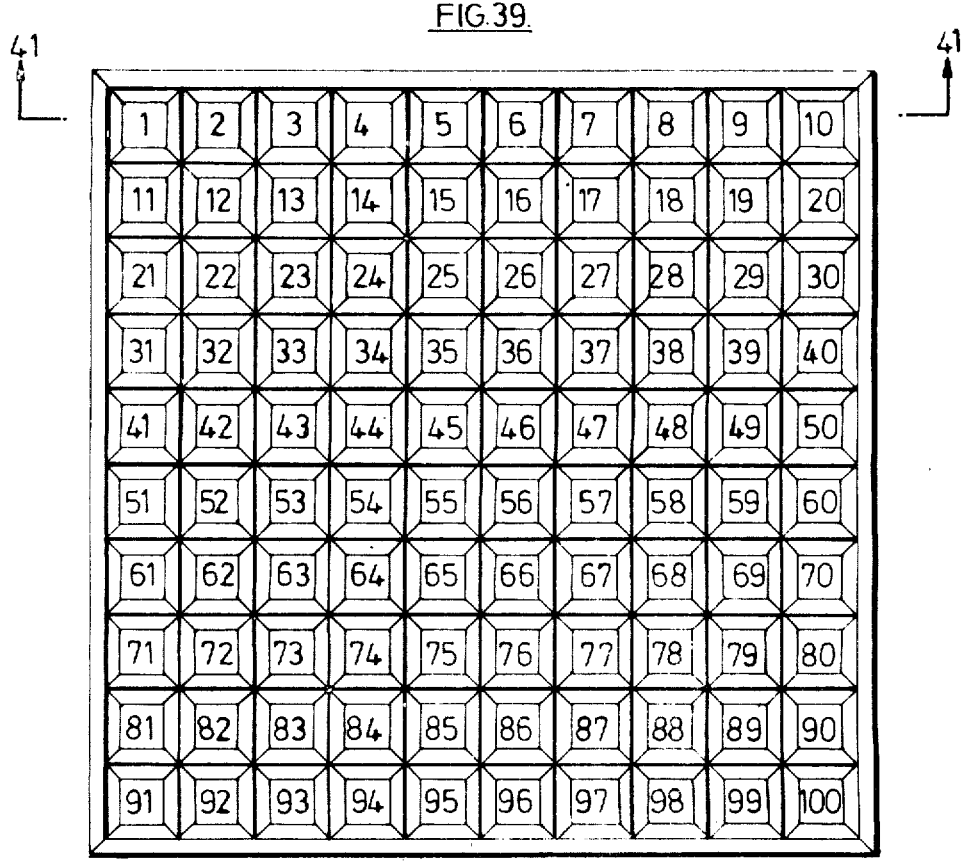

FIG. 39 is similar in function to FIG. 1.

Figure 40:
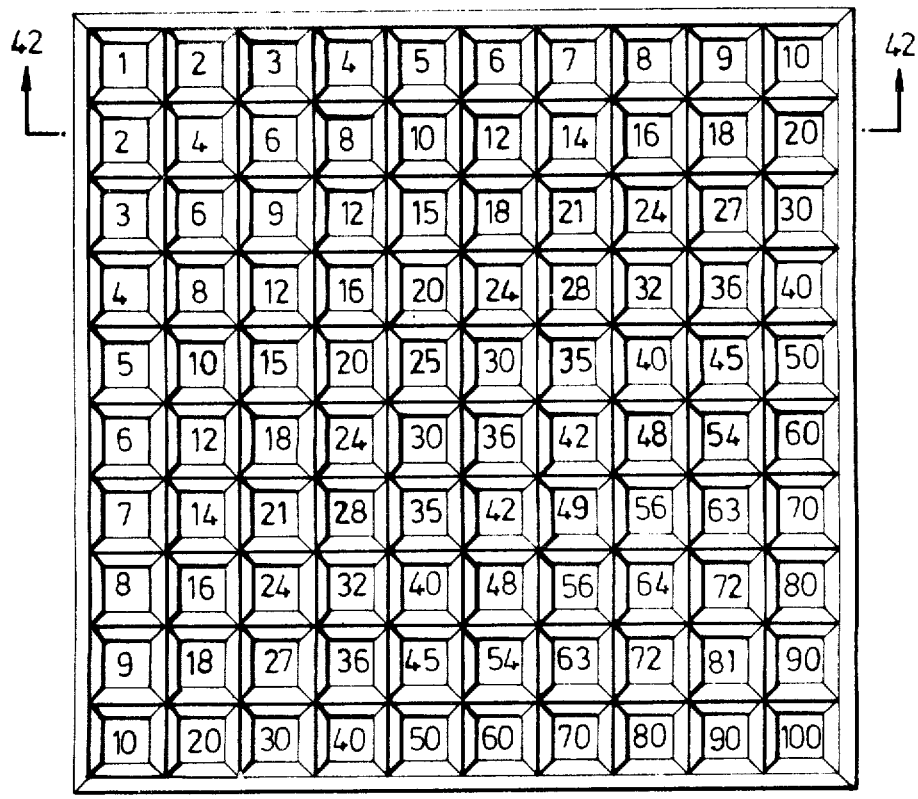

FIG. 40 is similar in function to FIG. 3.

Figure 41:

FIG. 41 represents a cutaway cross section view along line 41—41 of FIG. 39. This plate has symbols printed, embossed, or molded on one or both surfaces. Either surface can face upward during use.

Figure 42:

FIG. 42 is a cutaway cross section along line 42—42 of FIG. 40. This plate has the symbols in FIG. 39 molded on one surface, and the symbols in FIG. 40 molded in the other surface. Either surface can face upward during use.

Figure 43:
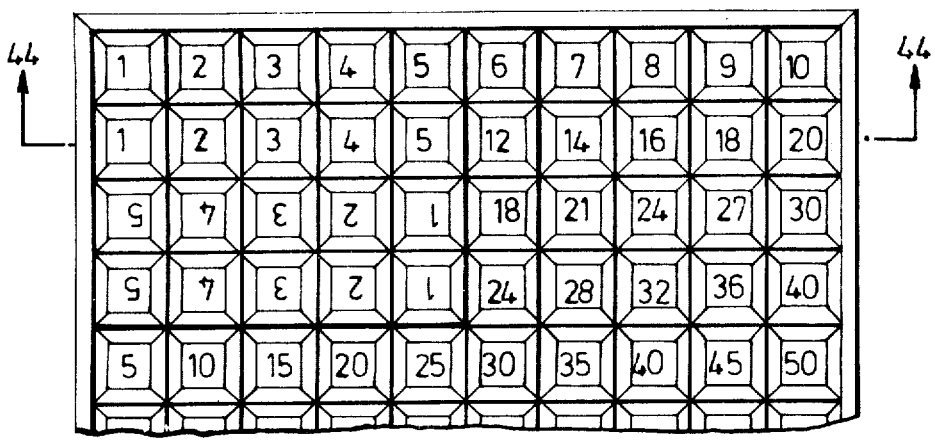

FIG. 43 is a cutaway view of FIG. 40 with four counting bars of five units in length positioned on its upper surface so as to demonstrate that $4 \times 5 = 20$. The 20 can be revealed by looking under the unit that is in the lower right hand corner.

Figure 44:
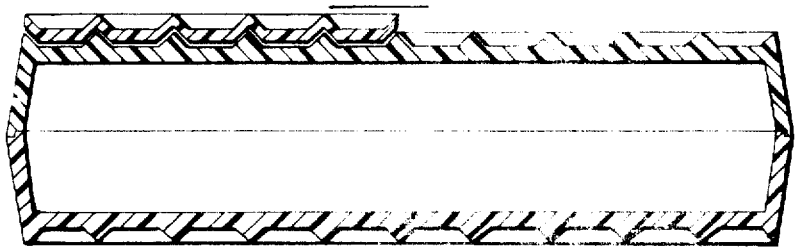

FIG. 44 is a cutaway cross section view along line 44—44 of FIG. 43. FIG. 44 illustrates the use of the design features illustrated in FIGS. 39 through 53 on the outer surface of a storage case. FIG. 44 also illustrates one manner of nesting a counting bar with this design.

FIG. 45 illustrates another way of nesting the counting bars illustrated in FIGS. 46 through 52. FIG. 45 shows how the under side of FIG. 41 can be turned face up and used with counting bars that are also inverted from the positions illustrated in other FIGS. FIG. 45 illustrates counting bars of one, two, and four units in length in quite close apposition.

FIG. 46 represents both upper and lower view of a counting bar of one unit, to be used in conjunction with plates or storage halves illustrated in FIGS. 39 through 45.

FIG. 47 is a cutaway cross section view along line 47—47 of FIG. 46.

FIG. 48 is a counting bar of two units in length, and one unit in width.

This type of counting bar does not have a narrow segment between units as do counting bars illustrated in FIGS. 6 through 14; 15 through 18; and 32 through 38.

FIG. 49 is a cutaway cross section view along line 49—49 of FIG. 48.

FIG. 50 is a counting bar of two units in width and five units in length.

There are no segments between adjoining or apposing units in this type of counting bar.

FIG. 51 is a cutaway cross section along line 51—51 of FIG. 50.

FIG. 52 is the upper view of a stack of three connecting bars, each bar being three units in width and three units in length. The bar is numbered to show the three unit by three unit relationship.

FIG. 53 is a cutaway cross section view along line 53—53 of FIG. 52. FIG. 53 and FIG. 52 illustrate how a student can learn cube — or three dimensional relationships, e.g. $3 \times 3 \times 3 = 27$.

Figure 54:
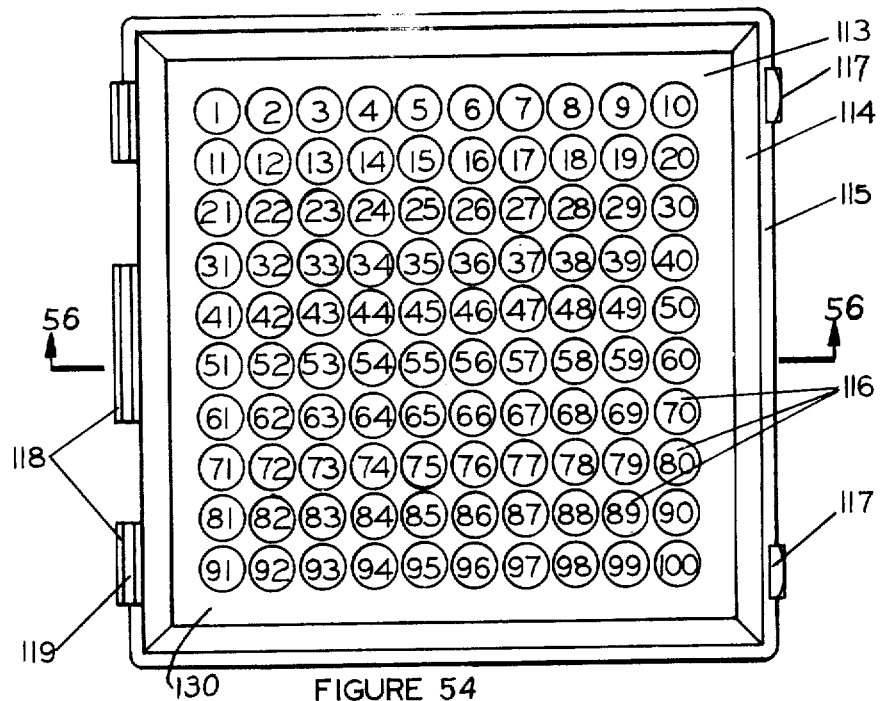

FIG. 54 shows the inner surface of one half of a storage case which has catchment areas for discs or spheres — which can be joined like "pop beads".

Figure 55:
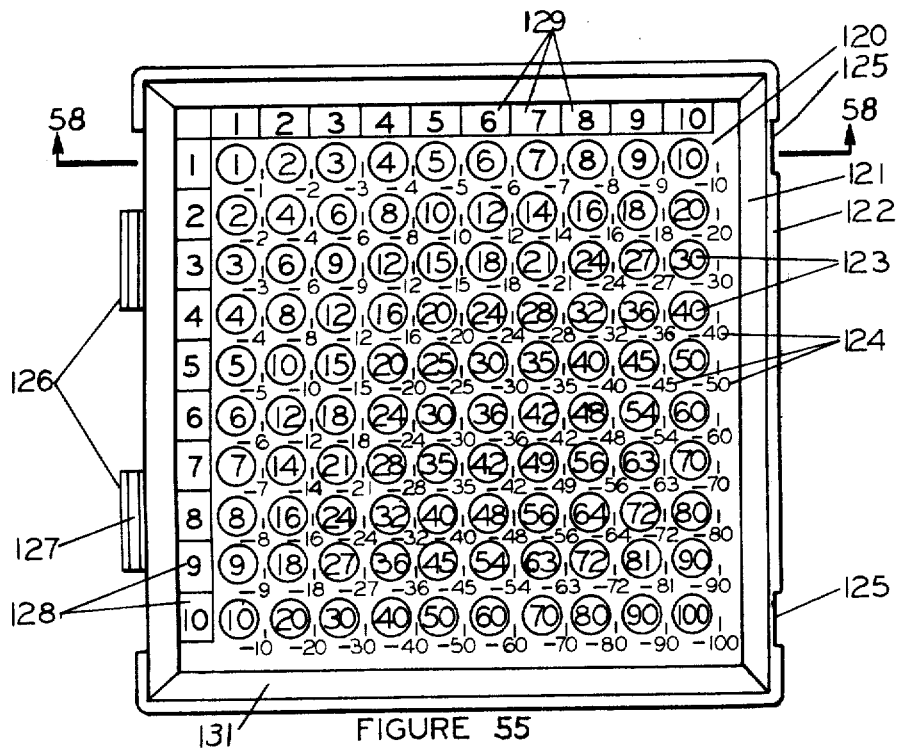

FIG. 55 shows the inner surface of the other half of the storage case which has round shaped catchment areas — and lines and numerals that denote the products of multiplier and multiplicand — immediately to the right and below product number.

FIG. 56 is a cutaway cross section view along line 56—56 FIG. 54.

FIG. 57 is an end view of FIG. 54.

FIG. 58 is a cutaway cross section view along line 58—58 of FIG. 55.

FIG. 59 shows the two storage case halves of FIGS. 54 and 55 joined to form a storage case.

FIG. 60 shows linked spheres — that have a joining means so they can be linked to form a chain of different links — The centers of the spheres are the same distance apart as the centers of the circular catchment areas of FIGS. 54 and 55.

FIG. 61 is a cross section across the pop bead spheres.

FIG. 62 shows an alternate form of a square grid on the inside of the carrying case, and FIG. 65 illustrates a hinge pin.

FIG. 63 shows the upper surface of square units that can be utilized in the case shown in FIG. 62.

FIG. 64 shows a cross section of the square units in FIG. 63 along line 64 — 64 shown in FIG. 63. These units show joining and locking members at the end which allow them to be linked together in a chain.

In FIGS. 1, 2, 5, 15, 17, and 19, numeral 1 represents a moulded plastic plate, box like in shape that comprises one half of a storage case.

In FIGS. 3, 5, 18, and 19, the numeral 8 represents a plastic plate, box like in shape that comprises the other half of the storage case.

In FIGS. 1, 2, 15, and 17, numeral 2 illustrates one half of the hinge that connects plastic body 1 to plastic body 8 through hinge half 9, a part of plastic body 8.

Figure 5:
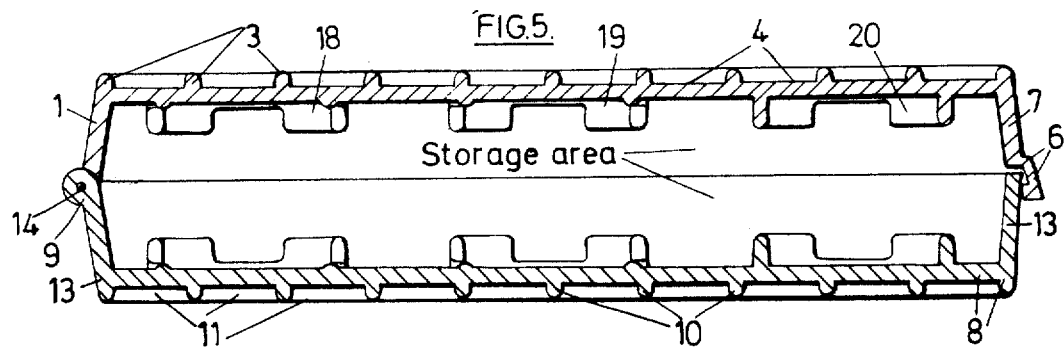

FIGS. 5 and 19, reveal cutaway cross sections of plastic body 1 and plastic body 8 that illustrate the relationships of the two storage case halves to each other in their 180° open positions, AND in their closed position.

In FIGS. 1, 2, 5, 15, 17 and 19, numeral 3 illustrates an elevated series of parallel ridges 3 that form a grid of ridges that surround recessed areas 4.

In FIGS. 1 and 17, the numerals 5 are an orderly, progressive sequence of numbers 5 located in the bottom of recessed areas 4. Orderly sequence of numerals 5 in FIGS. 1 and 17 proceed from number 1 in the upper left hand corner of plastic body 1 to the number 100 in the lower right hand corner.

FIGS. 1, 2, 5, 15 and 17 illustrate that plastic body 1 has a side wall 7 on all four sides, and an outer elevated rim 6 on three sides. Half hinge 2 is on the fourth side. Elevated outer rim 6 provides a recessed area for the nesting of plastic body 8 in plastic body 1 as is illustrated in FIG. 5.

In FIGS. 3, 4, 5, 18 and 19, numeral 8 represents the plastic body 8, box in shape, and numeral 9 represents one half of the hinge.

In FIGS. 3, 5, 18 and 19, number 10 represents a series of parallel ridges that intersect to form a grid of ridges 10. Grid of ridges 10 surrounds recessed areas 11.

FIGS. 3 and 18 illustrate recessed areas 11 containing numbers 12, representing multipliers, multiplicands, and the products of the multiplication tables. Multipliers from one to ten are in the left hand column, and multiplicands from one to ten are in the top row of numbers. The products are contained in recessed areas in an orderly manner.

FIGS. 3, 4, 5, 18 and 19 illustrate plastic body 8 having a side wall 13 on all four sides. Half hinge 9 is attached to side wall 13 along one side. Side walls 13 just fit within elevated rim 6 of plastic body 1, (see FIG. 5).

FIGS. 1, 2, 5, and 19 illustrated how hinge pin 14 joins plastic body 1 to plastic body 8 to form a storage case that has four surfaces that can be used in conjunction with materials stored within the case.

FIG. 19 illustrates the case in the opened position which allows a child to use its inner surfaces for manipulation of materials. FIG. 19 can be inverted so that both halves are in the position of the half illustrated in FIG. 15.

FIG. 5 illustrates the case in the closed position which allows the storage of materials inside of the case when it is stored, or not in use.

FIG. 2 represents the inner bottom surface of plastic body 1. FIG. 2 shows circular catchment areas, numbers 15, 16, 17, 18, 19 and 20, and also catchment areas for fractions of circles, numbers 21, 22, 23, and 24. Catchment areas 15 through 24 provide catchment areas for whole discs, or fractions of discs.

FIG. 20 represents the top view of a single whole disc, constructed to make stacking an easy process. FIG. 20 also illustrates the value of that disc being revealed in both decimal and fractional form on its upper surface.

FIG. 21 represents a cross section along line 21—21 of FIG. 20.

FIGS. 22 and 23 correspond to FIGS. 20 and 21 but this disc is five units in height and its decimal and fractional value are printed on its upper surface.

FIGS. 24 through 29 represent top views of common simple fractions with their fractional and decimal value printed on their upper surface.

FIG. 30 represents a cutaway cross section view of FIG. 26 along line 30—30.

In FIG. 2, numerals 15 and 16 represent catchment areas for discs whose total is to be summed. This total or sum is to be represented in catchment area 17. In actual practice this summing may be accomplished by moving numbered discs and/or fractions of discs as are illustrated in FIGS. 20 through 29 from catchment areas 15 and 16 into catchment area 17; or this summing may be accomplished by the child moving an equivalent number of discs and/or fractions from another source into catchment area 17, until the sum in 17 matches the combines sum from catchment areas 15 and 16.

FIG. 31, a cutaway view along line 31-31 of FIGS. 1 and 2 illustrates the summing of a stack of three discs plus a stack of three discs to equal a stack that is six discs in height.

In FIG. 2, number 18 represents the catchment area for the minuend, number 19 the catchment area for the subtrahend, and number 20 the catchment area for the remainder. The disc materials may be manipulated in the two ways described above.

In FIG. 2, numbers 21, 22, 23 and 24 represent catchment areas for common fractions and with the fraction and its decimal equivalent imprinted above or below the catchment area. Catchment areas 21 through 24 are constructed to receive fractional discs illustrated in FIGS. 24 through 29. The student can then learn the relationship between the size of various fractions by manipulating fractional discs illustrated in FIGS. 24 through 29 in fractional catchment areas 21, 22, 23, and 24 in FIG. 2, and catchment areas 31, 32, 33, 34, 35, and 36 of FIG. 4.

FIGS. 5, 15 and 19 illustrate the construction of disc catchment areas: 15, 16, 17, 18, 19, and 20 of FIG. 2; and catchment areas 25, 26, 27, 28, 29, and 30 of FIG. 4. This construction includes both a continuous circular low rim, and an interrupted circular higher rim. This interrupted higher rim allows the discs to be easily positioned and removed from the catchment area.

In FIG. 4, number 25 is the catchment area for the multiplier, number 26 is the catchment area for the multiplicand, and number 27 is the catchment area for the product.

In FIG. 4, number 28 is the catchment area for the dividend, number 29 is the catchment area for the divisor, and number 30 is the catchment area for the quotient.

In FIG. 4, numbers 31 through 36 are catchment areas for common simple fractions of discs. These fractional discs are represented in FIGS. 24 through 29. The purpose of these fraction catchment areas is to allow the child to become familiar with common simple fractions and their decimal equivalents by fitting fractions of discs into these catchment areas and comparing the fit and also noting the fraction and decimal associated with that catchment area.

FIG. 6 represents the top view of a numbered, rectangular, segmented counting bar 37 that is one unit in width and over five units in length. On the upper surface of segmented counting bar 37 are ridges 38 that divide segmented bar 37 at single unit intervals. Also on the upper surface of segmented counting bar 37 are an orderly sequence of numerals 39. The square units comprising rectangular bar 37 are of the same length and width. This measurement is indicated by the numeral 40a. The narrow segments connecting these square units are of a standard width 38a.

FIG. 7 represents the bottom view of numbered, rectangular, segmented counting bar 37. On the bottom surface are square ridged rim extensions 40 below the surface of the bar that allow for nesting. These square ridged rim extensions are one unit (40a) in width and one unit (40a) in length. FIG. 7 illustrates five such unit size square ridged rim extensions extending from a segmented counting bar of over five units (40a) in length and one unit (40a) in width. Number 41 represents the numbering of units on the bottom flat surface of counting bar 37.

FIG. 8 is a cutaway cross section view along lines 8—8 in FIGS. 6 and 7. FIG. 8 illustrates ridges 38 of width 38a, and underlying connecting segments of material also of width 38a. FIG. 8 also illustrates square ridged rim extensions 40 of one unit — 40a — in width and one unit 40a in length, and of these units being connected by segments of material of width 38a.

FIGS. 9, 10 and 11 illustrate a numbered rectangular segmented counting bar 42, similar in construction to segmented bar 37 illustrated in FIGS. 6, 7 and 8 but of shorter length and containing fewer units. Counting bar 42 is numbered on only one surface.

FIGS. 12, 13 and 14 represent an unnumbered counting bar of one unit, 40a, in length; and one unit 40a, in width.

In general, the counting bars represented in FIGS. 6 through 14 will have a length and/or width made up of the number of units plus the number of connecting segments in that given length and/or width.

FIG. 17 is a cutaway view of the numbered grid revealed in FIG. 1 on which segmented counting bars have been placed in an orderly manner. The counting bars shown are of one unit in width and are of one to slightly over five units in length. The counting bars are placed in orderly sequence from left to right, and from top to bottom, starting with the recessed numeral 1 in the upper left hand corner. The counting bars then continue until the last unit of the last bar covers the imprinted number 19 (or any other numbers). This placement of counting bars containing 5, 2, 3, 4, 1, 1, and 3 units illustrates that their sum is 19. The number 19 is covered by the last unit on the right in the bottom row of imprinted numbers.

Subtraction may be achieved by placing counting bars of various lengths on the upper surface of plastic body 1 until the number equals the minuend. These units are then placed in an orderly manner, as in addition. The number of units to be substracted, the subtrahend, is then removed from the upper surface of plastic body 1. The sum of the units remaining represent the remainder. To indicate the remainder, the remaining bars are readjusted to conform to the pattern of orderly sequential numbers, as in addition. The number underlying the last unit on the right in the bottom row of counting bars represents the remainder.

In any manipulations with counting bars, a bar with a large number of units can be exchanged for two or more smaller bars whose sum of units is the same as the larger unit. This facilitates addition, substraction, multiplication, and division by allowing for proper fit in the grids of recessed areas.

FIG. 15 is a cutaway view along line 15—15 of FIG. 17, and is designed to illustrate how the segmented counting bars illustrated in FIGS. 6 through 14 nest on the parallel ridges 3, and in recessed areas 4 in a numerical grid of numbers 5 that represent an orderly sequence of numbers as illustrated in FIG. 1.

FIG. 18 is a cutaway view of FIG. 3 which seven segmented bars containing six units each have been placed so as to reveal how plastic body 8 is to be used in conjunction with numbered segmented bars to reveal relationships of multiplier, multiplicand, and product. The counting bars containing six units each are positioned so as to reveal the use of grid of ridges 10, recessed areas 11, and numerals 12. Numerals 12 represent the products of multipliers and multiplicands up to ten times ten. The manner in which the lower aspects of these counting bars nest in recessed areas 11 is illustrated in FIG. 15. The seven counting bars of six units each are so placed that they reveal the product of six times seven. The product 42 is revealed when the student looks at the numerical figure hidden by the unit in the lower right hand corner.

FIGS. 32, 33, 34, 35, and 36 illustrate that segmented counting bars of more than one unit in width can be used in conjunction with segmented counting bars of one unit in width. FIGS. 35 and 36 illustrate how counting bars of one unit in width illustrated in FIGS. 6 through 14 can be placed on top of segmented units of two or more units in width. FIG. 35 also illustrates how smaller segmented bars can be placed on top of a larger segmented bar, so that the sum of the smaller units can equal the number of units of the larger segmented bar of one or more units in width.

FIG. 36 is a cutaway cross section through line 36—36 of FIG. 35.

FIG. 16 is to illustrate how four numbered segmented units as illustrated in FIGS. 6, 7, and 8 can be stacked so that four such segmented bars sum to 20 or represent the product of four times five or 20. Similar manipulations can be performed with other counting bars of different length and width.

FIG. 37 illustrates the combination of counting bars possessing a smaller number of units being placed over a counting bar with a larger number of units to illustrate the relationship of the numbers in common fractions such as 3/5. This is illustrated by assuming the bottom unit is equal to one piece with five parts. Other fractions such as ⅕, ¾ can be illustrated in a similar manner.

FIG. 38 illustrates the placement of counting bars with a larger number of units being placed over a counting bar with a smaller number of units to help the student understand fractional relationships when the fraction is greater than one. That is, as is illustrated in FIG. 38, when the bottom counting bar of three units is equal to one, the fraction represented by the combination would be equal to 5/3 or 1 ⅔.

FIGS. 39 through 53 are similar in design and function to FIGS. 1, 3, 5 through 19, and 32 through 38, except that the narrow space 38a between counting units is not present in this design and the ridges of the elevated grid are angular rather than curved.

FIGS. 41 and 42 show plates making up the 10 × 10 grid of recessed areas, instead of using halves of a storage case as illustrated in FIGS. 5 and 44.

FIG. 45 shows how with this design, when a plate is constructed as in FIG. 41, either surface of the plate can be used, and the counting bars will align themselves on either side.

FIGS. 46 through 53 correspond to FIGS. 6 through 14 except this design of counting bar has angular ridges and no narrow segment of connecting material is present between individial units of the counting bar.

FIGS. 39 through 45 are so designed to accommodate the units in FIGS. 46 through 53, and these plates, or storage halves also have no separating ridge that allows the units to be separated at their edges.

FIGS. 54 to 64 show another version of this invention. In this version only the inner large flat surfaces are used as a grid of numbered catchment areas. This version also shows the use of circular recessed areas in the grid, and also illustrates the use of linked units e.g. counting bars, that join at the ends to form a linked chain.

The storage case shown in FIGS. 54 to 58 consists of two moulded plastic halves 130, 131 adapted to be joined by a hinge comprising hinge portions 118 and 126 which receive a hinge pin (not shown). As seen in FIG. 54, one half casing 130 of the storage case has a rim 115 along its edge 114 around an inner surface 113. The rim 115 has catches 117 adapted to engage in shaped recesses 125 (FIG. 55) in the other half casing 131. The inner surface 113 has one hundred numbered circular catchment areas or recesses 116 (FIG. 56) adapted to receive spheres 134 (FIGS. 60 and 61).

The other half case 131 has a similar rim 122 along its edge 121 which surrounds the inner surface 120. It has complimentary hinge portions 126 which have internal bores 127 adapted together with bores 119 in hinge portions 118 to receive a common hinge pin. Surface 120 also has round catchment areas 123, numbered from 1 to 100, adapted to receive spheres 134 (FIG. 60). The row of FIGS. 1 to 10 denoted by numeral 128 represents the multiplier and the row of FIGS. 1 to 10 denoted by numeral 129 represents the multiplicand.

The products of multiplier and multiplicand are represented by rows of numerals marked 124.

FIG. 59 shows the storage case closed for transit by a hinge pin 132 and fastening means 133 formed by engagement of catches 117 in shaped recesses 125.

The spheres 134 join together like pop beads as shown in FIGS. 60 and 61 to make up a string of spheres representing any desired number. Each sphere 134 has a recess 138 closed except for a small gap 137 and, adapted to receive a bulbous end 136 of an extension 135. FIG. 60 shows a group of five spheres joined and a group of three, whereas FIG. 61 shows a group of three and a single sphere.

Use of these spheres is similar to use of the counting bars described previously. For example to find the product of 6 and 7, six rows of seven spheres each are placed in recesses in the half casing 131. The product can be read of as 42 which the figure occuring in the rows of figures 124 immediately below the right-hand side of the last recess to be filled by a sphere.

In the modification shown in FIG. 62 the half casing has an inner surface 139 surrounded by a moulded edge 140 with a rim 141. There is a grid 142 of square recesses formed in surface 139 adapted for use with square units 143 (FIGS. 63 and 64). These units can be joined like the spheres described above. They have recesses 146 to receive bulbous ends 145 of extensions 144.

I claim:
1. A mathematical aid comprising:
    a counting member having an upper face provided with a pattern of ridges having sloping sides and dividing the face into an arrangement of n × n recessed areas representing an orderly series of numbers; and
    a plurality of solid, relatively thin, multiple segment counting bars which may be positioned on said counting member to portray mathematical relationships, each bar comprising a plurality of joined segments defining units that collectively represent a number, each of said bars presenting opposed, upper and lower major surfaces, said lower surface having channel-like recesses therein provided with sloping sides for complementally receiving said ridges on the member to nest each unit of the bar in any one of the areas of said member, whereby to retain the units in place and provide selfcentering and selfalignment of the units of each bar with respect to the corresponding selected areas of said member,
    said upper surface of each bar having ridges thereon provided with sloping sides complementally receivable in the channel-like recesses in the other of said bars upon stacking thereof to center and align the units of the stacked bars.
2. The mathematical aid as claimed in claim 1, wherein numerical indicia is provided on areas and said units to illustrate counting sequences and mathematical operations.
3. The mathematical aid as claimed in claim 1, wherein said areas and said units are symmetrical and of like geometric configuration.
4. The mathematical aid as claimed in claim 1, wherein adjacent units of each of said bars are contiguous along common, opposed recesses and ridges thereof.
5. The mathematical aid as claimed in claim 1, wherein adjacent units of each of said bars are joined by relatively narrow, integral connecting segments presenting said recesses and ridges thereof.
6. The mathematical aid as claimed in claim 1, wherein is provided a pair of said members in the form of a pair of plates presenting two halves of a storage case adapted to contain said bars.

* * * * *